(12) United States Patent
Morris (10) Patent No.: US 8,219,996 B1
(45) Date of Patent: Jul. 10, 2012

(54) COMPUTER PROCESSOR WITH FAIRNESS MONITOR

(75) Inventor: Dale C. Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1462 days.

(21) Appl. No.: 11/746,067

(22) Filed: May 9, 2007

(51) Int. Cl.
*G06F 9/46* (2006.01)
*G06F 15/173* (2006.01)
*G06F 9/30* (2006.01)
*G06F 13/00* (2006.01)

(52) U.S. Cl. ........ 718/104; 718/102; 718/103; 712/214; 712/215; 711/128; 709/226

(58) Field of Classification Search ............. 718/104
See application file for complete search history.

(56) References Cited

U.S. PATENT DOCUMENTS

| | | | |
|---|---|---|---|
| 6,035,374 A | 3/2000 | Panwar et al. | |
| 6,058,466 A | 5/2000 | Panwar et al. | |
| 6,567,839 B1* | 5/2003 | Borkenhagen et al. | 718/103 |
| 6,584,488 B1* | 6/2003 | Brenner et al. | 718/103 |
| 7,065,596 B2 | 6/2006 | Kulick et al. | |
| 7,890,738 B2* | 2/2011 | Eisen et al. | 712/239 |
| 2008/0250233 A1* | 10/2008 | Marden et al. | 712/228 |
| 2008/0250415 A1* | 10/2008 | Illikkal et al. | 718/103 |

* cited by examiner

*Primary Examiner* — Jennifer To (57) ABSTRACT

A computer processor includes a fairness monitor for monitoring allocations of a processor resource to requestors. If unfairness is determined, a resource allocator is biased to offset said unfairness.

31 Claims, 4 Drawing Sheets

COMPUTER PROCESSOR WITH FAIRNESS MONITOR

BACKGROUND OF THE INVENTION

During processing of a series or "thread" of computer instructions, a processor may have to wait for main memory to be accessed or for an interrupt to be handled. A multi-threaded processor can make use of otherwise wasted processing cycles by processing a second thread of instructions. For example, a "switch on event multithreading" (SoEMT) processor switches threads in response to an indication that the active thread is or is about to be stalled so that processor cycles are fully utilized.

In its unmodified form, SoEMT strongly favors threads that rarely stall over threads that frequently stall. For example, consider the case where 1) thread A is active for 10 cycles and then stalls; 2) thread B is active for 100 cycles and then stalls; 3) thread A is active for 10 cycles and stalls; and 4) thread B is active for 100 cycles and stalls. It is clear that if this pattern continues, thread B will have access to 90% of the processor cycles, while thread A "starves".

To provide some level of fairness, the processor can force a switch between threads after a period of time in which an active thread has not generated any other switch events. However, the forced switches can occur at inopportune times, e.g., while time-critical code is being executed. For example, in a multiprocessor system other processors may be waiting for thread A to complete some operation (e.g., relinquishing a semaphore); a forced switch to thread B can cause the other processors to have to wait until thread A resumed.

To avoid inopportune forced switches, a thread can request priority to override a forced switch. However, requests for priority are readily abused, either intentionally (to maximize the performance of one's program at the expense of others) or unintentionally (forgetting to turn priority off when it is not needed). What is needed is a scheme providing better tradeoffs between maximizing performance and ensuring that each thread gets a fair share of processing power.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
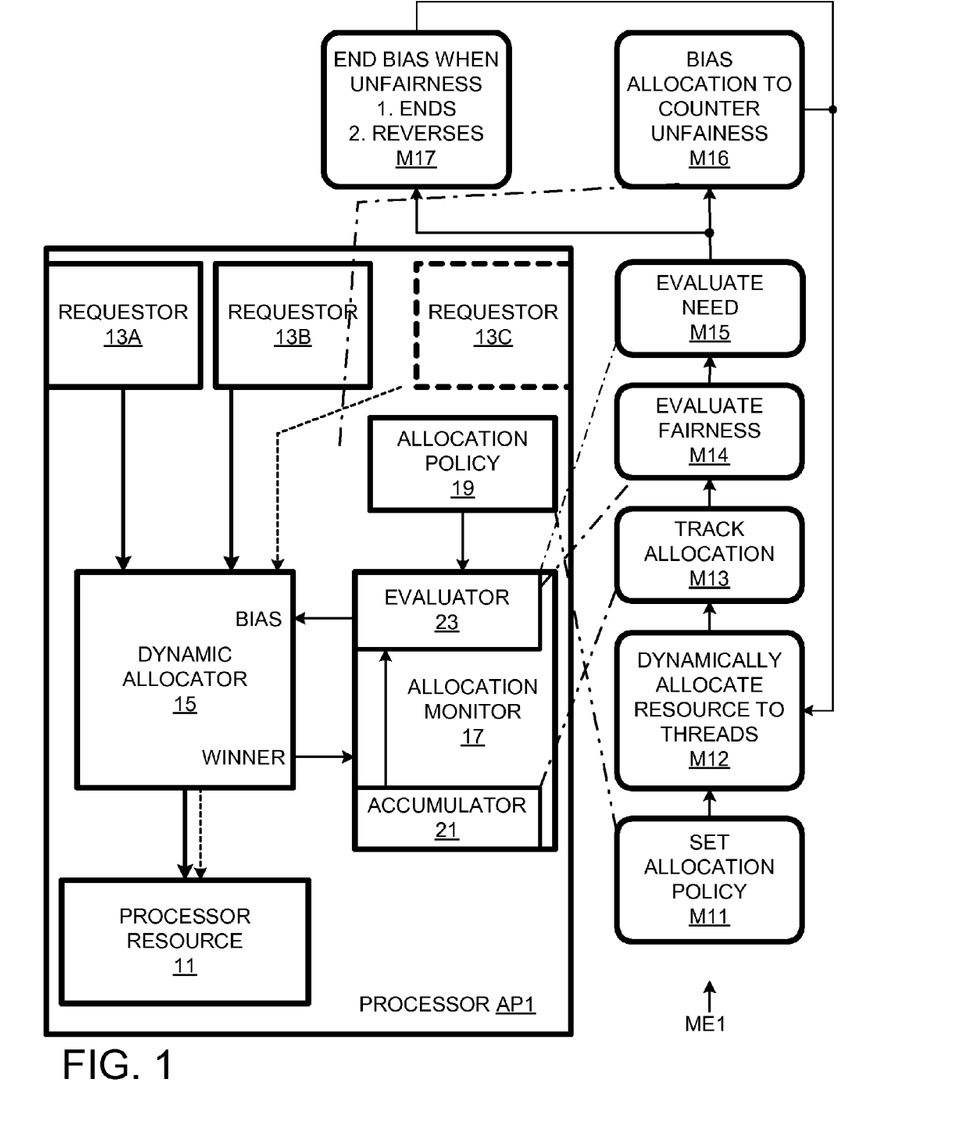
FIG. 1 is a combination schematic illustration and flow chart of a processor and a method in accordance with embodiments of the invention.

The present invention provides for monitoring fairness of processor resource allocations and for biasing resource allocations to offset cumulative unfairness in allocations. As shown in FIG. 1, a data processor AP1 includes a resource 11, requestors 13A and 13B, a dynamic resource allocator 15, an allocation monitor 17, and a programmable allocation policy 19. Depending on the embodiment and conceptualization, a requestor can be, for example, a pipeline, a thread, a core, or an execution stream. Allocation monitor 17 includes: an accumulator 21 for accumulating allocation data and a fairness evaluator 23, for evaluating the fairness of the accumulated allocation. "Fairness" is defined by allocation policy; by default, a fair allocation is an equal or nearly equal allocation.

At any given time, allocator 15 selects one of requestors 13A and 13B for access to resource 11. Over time, allocator 15 alternates between requestors 13A and 13B so that each requestor has access to resource 15 on a time-division multiplex (TDM) basis. As just described, two requestors are provided access to resource 11 one at a time. More generally, two or more requestors can vie for a resource, while an allocator dynamically allocates the resource to a non-exhaustive subset of those requestors at any given time. This point is illustrated by the inclusion of a dashed third thread 17C and a dashed arrows to and from allocator 15.

Processor AP1 implements hardware method ME1, flow charted in FIG. 1. At method segment M11, an allocation policy is set. This allocation policy defines "fairness". By default, the allocation policy is that allocations should be within a predetermined threshold of each other. However, allocation policy 19 can be set so that fairness is defined in terms of some other relationship. For example, a fairness target can be that the requestor 13A is allocated one quarter of the resource and requestor 13B is allocated three-quarters. In some embodiments, there is no provision for programming an allocation policy; in such embodiments, fairness is defined relative to time-averaged equality.

At method segment M12, allocator 15 dynamically allocates resource 11 to requestors 13A and 13B. Generally, if only one requestor is requesting access to resource 11, allocator 15 allocates resource 11 to the requesting resource. If requestors 13A and 13B are contending for the same resource at the same time, allocator 15 chooses between them according to some allocation procedure. Specific allocation procedures are discussed below with reference to FIGS. 2-4.

At method segment M13, allocation monitor 17 detects the requestor selected for each allocation. For example, allocator 15 can indicate a "winner" for each allocation procedure to monitor 17. Accumulator 21 tallies allocations for each pipeline. Evaluator 23 compares the tallies across processes and determines, according to policy 19, whether the comparison is sufficiently skewed that unfairness is indicated.

Even if the allocation is unfair, no bias may be required if the "victim" does not need more that it is receiving. The invention provides for handling this situation in a variety of ways. In the embodiment of FIG. 1, need is evaluated at method segment M15. An unfairness indicator can suppress if the victim's performance does not suffer from the deprivation. In other embodiments, the unfairness indication itself can be suppressed when there is no suffering.

If there is a suffering victim, then a bias is applied by allocator 15 to offset the unfairness at method segment M16. In some embodiments, greater unfairness can be countered with a stronger bias. In other embodiments, there is only one level of bias. Biases can be of various forms and extents. In the extreme, a requestor can be denied access to the resource entirely. In other cases, the bias leads to longer and more frequent accesses to resources by victims of unfairness.

Once bias is applied, there are choices for removing the bias at method segment M17. One approach is to remove a bias once fairness is indicated. Another approach is to maintain a bias until the bias is reversed in favor of the former victim. The latter approach implements a form of hysteresis that can compensate for unfairness that is unmeasured due to the limits of accumulator 21, and reduces the frequency at which the bias changes.

Figure 2:
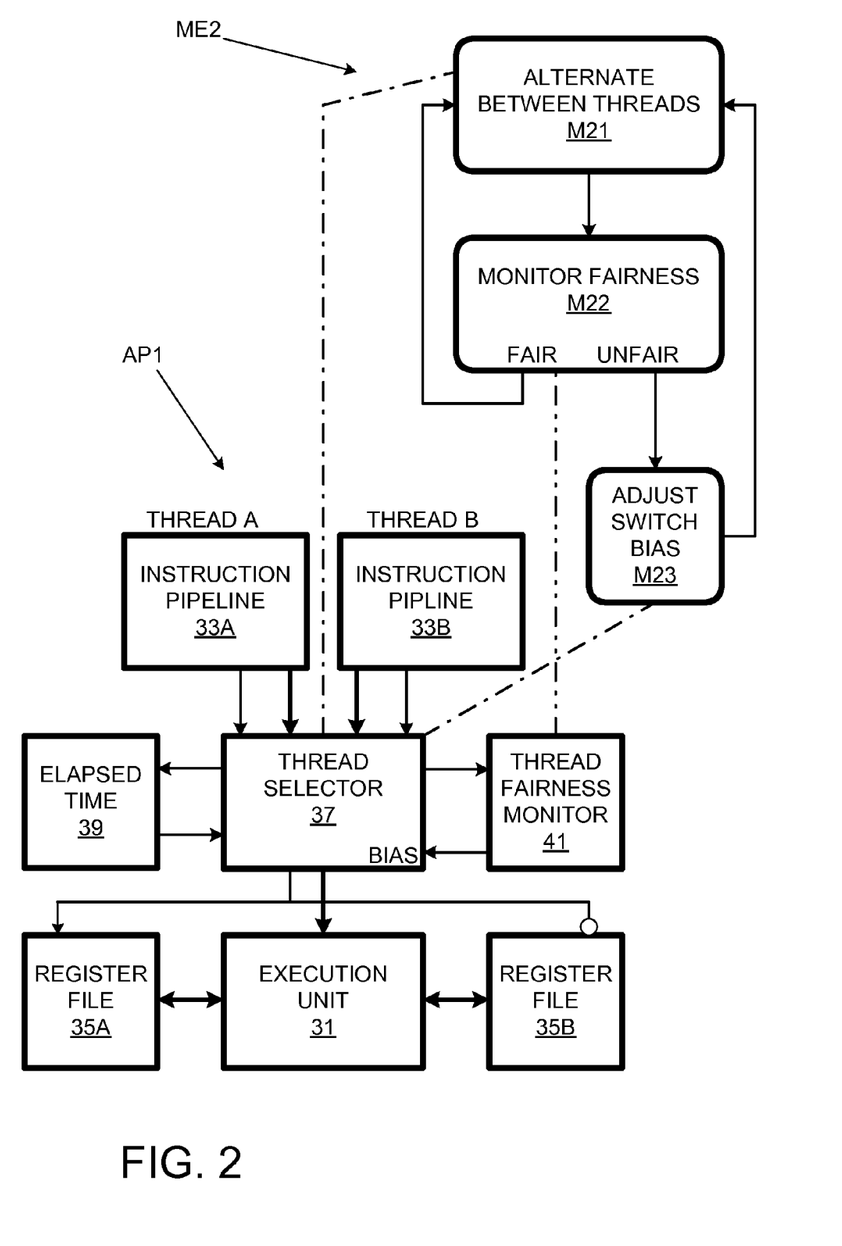
FIG. 2 is a combination schematic illustration and flow chart of the processor of FIG. 1 emphasizing an execution unit as a processor resource to be allocated among instruction pipelines.

Processor AP1 applies the invention to execution cycles, cache capacity, and other computer resources subject to contention. FIG. 2 depicts processor AP1 in its aspect in which threads compete for execution cycles. In FIG. 2, processor AP1 is shown having an execution unit 31 and instruction pipelines 33A and 33B for handling respective threads A and B, with respective register files 35A and 35B. A thread selector 37 selects at any given time which thread is to access execution unit 31 based on elapsed time, fairness, and thread indications of anticipated or actual idle states, priority needs, and indications of high and low priority. Thread selector 37 signals an elapsed time indicator 39 and a fairness monitor 41 when the active thread is switched. Elapsed time indicator 39, in turn, indicates time since the last switch, while fairness monitor 41 uses the switch indications to keep track of which thread is receiving the benefit of processor cycles at any given time. When thread selector 37 switches threads, it also switches between register files 35A and 35B to allow for effectively instant context switches.

A method ME2, flow charted in FIG. 2, is implemented in processor AP1 in accordance with an embodiment of the invention. At method segment M21, thread selector 37 allows one thread to be executed and then the other on a time-division multiplexed (TDM) basis. The switching can be periodic, with the periods being measured by elapsed time indicator 39.

Method segment M22, which is ongoing and concurrent with method segment M21, involves monitoring the fairness over time of the allocation implemented by thread selector 37. In the illustrated embodiment, fairness would result if, on a time-averaged basis, thread A of pipeline 33A and thread B, of pipeline 33B received equal or nearly equal allocations of processor cycles. A fair allocation would occur if a nominal periodic switching schedule were followed.

However, processor AP1 permits threads to indicate a low priority when an idle state is detected or anticipated. This can cause a switch to occur early, with the extra cycles going to the alternate thread. Also, a pipeline can indicate a high priority state, causing periodic switches to be suppressed, so that the asserting thread receives more than its fair share of processing cycles.

As long as any accumulated imbalance is zero or small, method segment M22 results in an indication of "fairness" and method segments M21 and M22 continue unchanged. However, if, over time, the accumulated unfairness reaches a predetermined threshold, fairness monitor 41 flags the unfairness and indicates which thread is benefiting from it. In response, a bias or a change in bias is applied by thread selector 37 in a direction that compensates for the unfairness at method segment M23. For example, if the indicated fairness favors thread A, then the bias favors thread B.

While a bias is applied, either 1) fairness is restored, 2) the unfairness remains about the same, or 3) or the unfairness becomes more severe. In case 3, a stronger bias can be applied once another unfairness threshold is crossed. In case 1, the bias can be removed. In case 2, the bias can remain the same as long since no more unfairness is accumulating. In an alternative embodiment, the bias is increased over time as long as the unfairness indication remains active. Note that if a system oscillates between fairness and unfairness in one direction, the cumulative result will be unfair. Accordingly, the illustrated embodiment applies some hysteresis to balance unfairness, e.g., thread selector 37 does not remove a bias until unfairness in the direction of the bias is detected.

Figure 3:
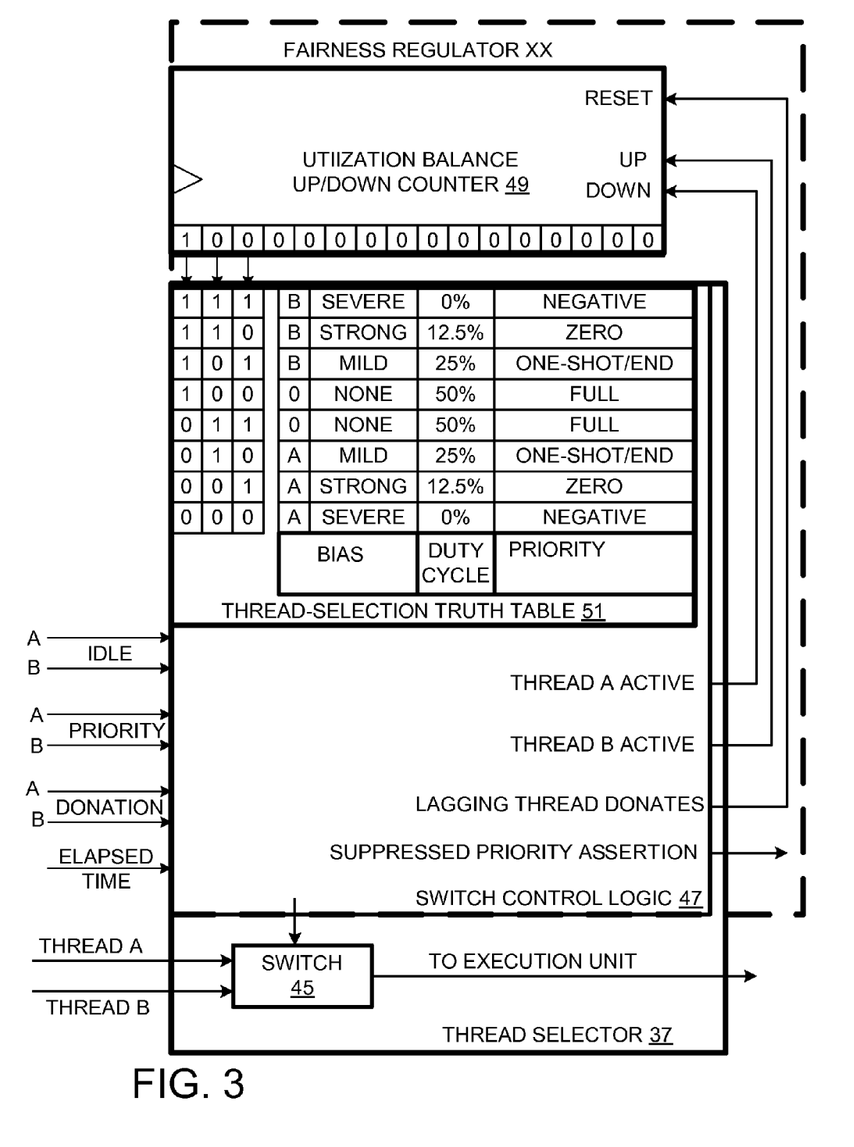
FIG. 3 is a schematic illustration of a fairness regulator of the system of FIG. 2.

Thread selector 37 and fairness monitor 41 collectively constitute a fairness regulator 43, detailed in FIG. 3. Thread selector 37 includes a TDM switch 45 and switch control logic 47. Fairness monitor 41 includes an up/down balance counter 49. Upon initialization, 16-bit counter 49 assumes the value 2**15 (one followed by fifteen zeroes in binary notation), which is in the middle of the range for counter 49. When thread selector 37 indicates to fairness monitor 41 that thread A (whatever thread is active in pipeline 33A) is active, counter 49 counts up, and when thread B is active, counter 49 counts down. Every processor cycle results in a count up or a count down. Alternative embodiments implement ratios of counts to clock cycles differing from 1:1 to implement a fairness target other than equality.

In the illustrated embodiment, changes in the thirteen least-significant bits do not affect the bias applied by control logic 47. In addition, a change in the three most significant bits between 100 and 011 represents a negligible shift in fairness. According, a change between 100 and 011 does not trigger a bias if one is not being applied. On the other hand, while a bias is applied, such a change can indicate a return to fairness, and thus trigger a removal of bias. In an alternative embodiment, bias is removed upon a return to the 011-100 range. However, waiting until the 011-100 boundary is crossed imposes some hysteresis that prevents rapid oscillations between biased and unbiased states.

Initially, while the three most-significant bits are in the 011-100 range, switching is performed on a 50% duty cycle to evenly distribute processor cycles between threads A and B. However, periodic switches can be overridden so that unfairness results.

As indicated in truth table 51, an MSB value of 101 indicates moderate unfairness in favor of thread A. In response, thread selector 37 applies a mild bias favoring thread B. In this case, the mild bias involves shifting the thread A duty cycle to 25%. In addition, the ability of thread A to suppress switches by asserting priority is curtailed, although not eliminated. Specifically, at most one period switch can be suppressed per switch cycle. When a second period switch cycle occurs, any assertion of priority by thread A is ignored.

If, despite the application of bias, unfairness continues to favor thread A and a count of 110 is reached, a stronger bias is applied. In this condition, switch selector reduces the duty cycle for thread A to 12.5% and ignores all assertions of priority by thread A. If unfairness becomes more extreme so that a count of 111 is reached, a severe bias is applied to thread A—thread A is denied access to execution unit 31. Complementary mild, strong, and severe biases are applied when counter 49 indicates unfairness favoring thread B as respective MSB values of 010, 001, and 000 are encountered.

As indicated above, once a bias is applied, it is not removed immediately upon return to the 011-100 range. Instead, bias removal awaits a crossing of the 011-100 boundary. For example, a bias favoring thread A is not removed until the MSB reach 100, and a bias favoring thread B is not removed until the MBS reach 011.

Note that when a thread indicates that an idle state is present or anticipated, a switch-on-event is triggered. When a thread asserts "high priority", periodic switches can be suppressed to the extent permitted by the current bias level. In some cases, a thread may assert low priority (or "low need") and donate cycles to the other thread. In response to a donation indication from a thread, logic 47 causes counter 49 to reset if the count indicates any unfairness in favor of the donating thread. For example, if thread A issues a donation indication, counter 49 is reset if the MSB is zero, but not if the MSB is 1. Complementarily, if thread B issues a donation indication, counter 49 is reset if the MSB is 1, but not if it is 0.

If thread A has asserted high-priority, its assertion remains until it deasserts it, or until unfairness (at some pre-determined level) is signaled. If unfairness is signaled, the priority assertion is automatically suppressed. Thus, forgetting to deassert high-priority does not have lasting effects. A thread can take more than its fair share of cycles until some fairness limit is reached; then, the high priority is forcibly deasserted.

The present invention promotes fairness, not only at runtime, but also during programming. A programmer who makes judicious use of priority requests is more likely to have them honored because fairness is more likely to be maintained. A "greedy" programmer who makes excessive priority requests is likely to cause bias conditions under which priority requests are dishonored. A careless programmer who forgets to turn off priority requests when they are not needed will also have requests suppressed. As an alternative moderate bias tactic, one could allow one priority request and then suppress all subsequent priority requests until a switch occurs. This tactic would a slow the onset escalation to severe bias conditions and, thus, ameliorate the penalty applied to unending priority assertions.

The invention is also forgiving of some programming errors. If a programmer provides for an assertion of priority but fails to end the assertion, the present invention provides for fair, if not completely optimal, allocations between threads. Programming errors involving failing to end a state, such as a priority assertion, can be hard to debug. In the illustrated embodiment, a notification is issued when a priority assertion is suppressed that can be used in debugging to help locate such errors.

Figure 4:
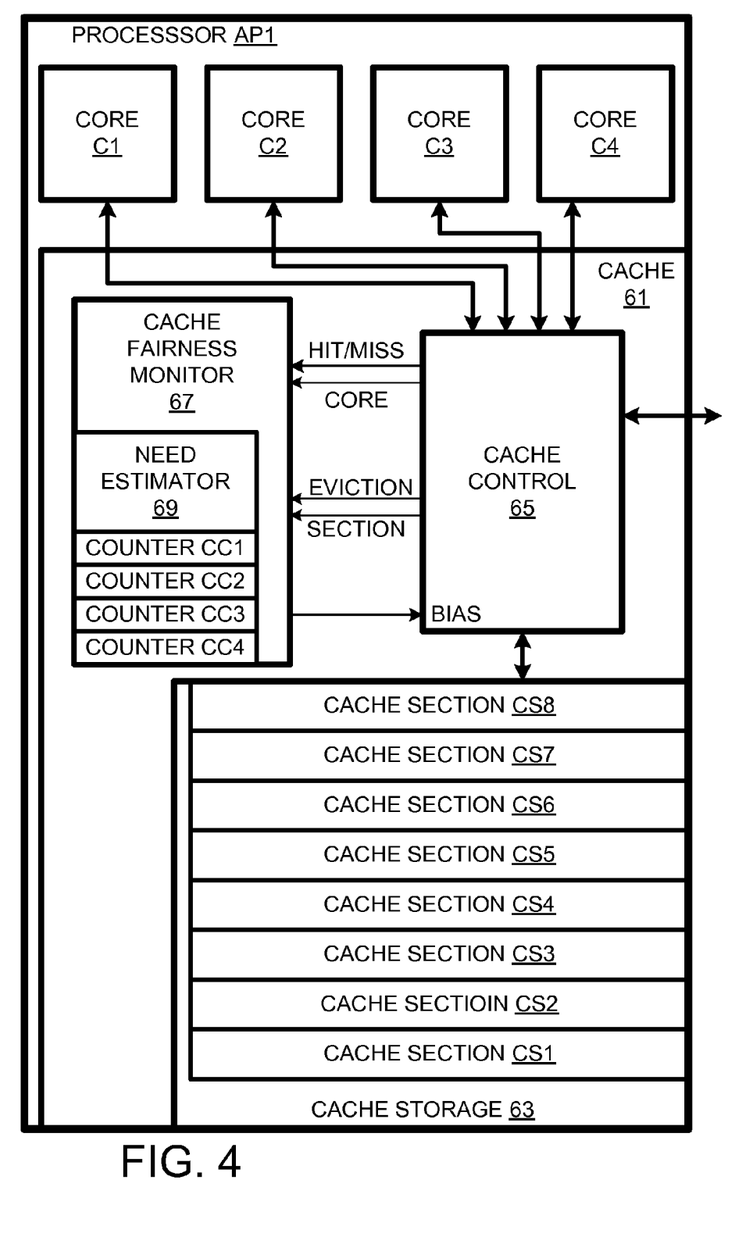
FIG. 4 is a schematic illustration of the processor of FIG. 1 emphasizing a cache as a processor resource to be allocated among processor cores.

As noted in the discussion relating to FIG. 1, the present invention applies to resources other than processor cycles when fairness is an issue. FIG. 4 shows that processor AP1 has multiple processing cores C1-C4 sharing a common cache 61. Cache 61 includes storage 63, a controller 65, and a cache fairness monitor 67. Cache 61 is an 8-way set associative cache in which each section CS1-CS8 holds 1024 64-bit lines for a total of 8192 cache lines (65,536-bytes). Cache 61 indicates various statuses for each cache line, e.g., valid versus invalid, shared versus private, and modified versus unmodified.

When a core attempts to access a main memory location, the address may or may not be represented in cache 61. If the data is represented in cache 61, i.e., the access results in a "hit", a time-consuming communication with main memory is avoided by providing data to the core directly from the cache. If the data is not represented in the cache, the data is fetched from memory and written into cache storage 63. (For an instruction cache, the referenced "data" is an instruction). Since cache 61 is 8-way set associative, there are potentially eight cache-line locations at which a cache line can be entered. If possible, the fetched data line is written to a cache line that has been marked invalid so that no useful data is evicted from the cache. If the fetched line cannot be written to a cache line location marked "invalid", data will have to be evicted from a cache line marked "valid" to make room for the new data.

Absent some fairness measure, a core accessing a lot of data over a short duration could clear the cache of previously entered data, including all data required by the other cores. The present invention provides a fairness scheme for limiting the ability of one core to take over a cache to the exclusion of the other cores.

Cache control 65 receives memory access requests from cores C1-C4, checks for the requested data, fetches the data from main memory in the event of a miss, and in either case of a hit or a miss, provides the data to the requesting core. For each such core request, cache controller 65 informs cache fairness monitor 67 of the request and the result. Cache fairness monitor 67 includes an up/down counter CC1-CC4 for each core C1-C4; each counter CC1-CC4 is incremented each time the respective core's request results in a miss (and thus an entry is made into cache storage 63).

If the entry requires eviction of data (i.e., the entry overwrote valid data), cache controller 65 informs cache fairness monitor 67 of the eviction and the section at which it occurred. Cache fairness monitor 67 speculates (as described below) as to which core the evicted line belonged and decrements the corresponding counter. In this way, each counter represents at least approximately the number of cache lines devoted to storing data for each core.

Each count is compared with a respective fairness threshold. The direction and magnitude of the differences are reported to cache control 65, which sets biases accordingly. By default, the thresholds are the total number of cache lines available divided by the number of cores. However, cache fairness monitor includes a needs estimator 60 for determining a ratio of misses to hits. This ratio can be used as a measure of need, which can be used to adjust the determination of fairness. For example, if one core has a much lower need than another, its "fair" allocation can be less than an equal share.

Fairness monitor 67 compares the counts of counters CC1-CC4 with thresholds. The sign and magnitude of the differences between counts and thresholds can be used for differentiating fairness, excess, and deprivation. Cache controller 65 responds to the fairness indications by adjusting the caching algorithm.

The caching algorithm acknowledges cache section ownership by cores. For example, core C1 can "own" cache sections CS1 and CS2, core C2 can own sections CS3 and CS4, core C3 can own sections CS5 and CS6, and core C4 can own sections CS7 and CS8. When a fairly treated core needs to insert an entry, the caching algorithm can give preference to the owned sections, while also taking other factors into account such as recency and validity. If the core is "deprived", it can be given exclusive use of its sections while also being able to use other sections. If the core is "greedy", it can be restricted to using its own sections. This scheme should be effective at minimizing unfairness without having to concoct different levels of bias responses.

Since the caching algorithm uses an ownership concept, indicating the section from which an entry was an evicted can assist speculation regarding the core associated with an evicted entry. Thus, the ownership factor aids fairness evaluation as well as providing a basis for biasing. In an alternative embodiment, the requestors are not the cores themselves or the associated streams, but the threads the make up the streams. Thus, with four cores running two threads each, eight threads are competing for cache capacity.

In an alternative embodiment, only cache insertions are counted. The fairness monitor uses up-counters and resets them when the most significant bits are all one. The fairness implementation should prevent any counter from reaching the maximum value it can represent before the most significant bit of the most lagging counter becomes a "1". In any event, the counters stop counting when the maximum is reached and do not wrap around so that no wrap-around ambiguities are presented.

Another approach to monitoring cache usage would involve storing with each cache line the identity of the core that called for it. Keeping track of the extra line state information can be costly. These and other variations upon the illustrated embodiments are provided for by the present invention, the scope of which is defined by the following claims

What is claimed is:

1. A computer processor comprising:
   a hardware resource;
   requestors configured to request access to said hardware resource;
   a resource allocator configured to allocate said hardware resource among said requestors;
   a fairness monitor including a counter, said fairness monitor being coupled to said resource allocator, said fairness monitor configured to:
   use said counter to track allocations of said hardware resource to said requestors to yield allocation counts representing a comparative allocation;
   determine whether said comparative allocation is fair, unfair favoring a first requestor, or unfair disfavoring said first requestor;
   cause said resource allocator to bias said allocating to favor said first requestor in response an indication by said allocation counts that said comparative allocation has transitioned from fair to unfair disfavoring said first requestor while said allocating is unbiased; and
   cause said resource allocator to continue to bias said allocating in response to an indication by said allocation counts that said comparative allocation has transitioned from unfair disfavoring said first requestor to fair while said allocating is biased favoring said first requestor.

2. A computer processor as recited in claim 1 wherein said fairness monitor causes said resource allocator to bias said allocating in favor of the first requestor when the first requestor is a victim of unfairness as determined by said fairness monitor and performance of said first requestor has suffered as a result of said unfairness as determined by said fairness monitor.

3. A computer processor as recited in claim 2 wherein said resource allocator further ends said bias in favor of said first requestor while said fairness monitor indicates that the allocation is fair.

4. A computer processor as recited in claim 2 wherein said resource allocator ends said bias in favor of said first requestor in response to said fairness monitor indicating an unfairness favoring said first requestor.

5. A computer processor as recited in claim 2 further comprising pipelines for providing threads to said hardware resource, wherein said hardware resource is an execution unit, said resource allocator including a switch that selects one of said pipelines for connection to said execution unit at any given time.

6. A computer processor as recited in claim 5 wherein said resource allocator applies a bias by distributing processor cycles unevenly to said pipelines.

7. A computer processor as recited in claim 6 wherein said pipelines are coupled to said resource allocator for asserting idle indications thereto, said resource allocator deselecting a thread from a pipeline asserting an idle indication and selecting a thread from another pipeline.

8. A computer processor as recited in claim 6 wherein each of said pipelines is coupled to said fairness monitor for asserting donation indications thereto, said monitor resetting itself to indicate an increased fairness that disfavors a thread associated with the pipeline asserting the donation indication.

9. A computer processor as recited in claim 6 wherein said allocator forces a switch from a first thread to a second thread when said first thread has been selected for a predetermined number of processing cycles and no priority has been asserted the pipeline associated with said first thread.

10. A computer processor as recited in claim 9 wherein said resource allocator forces a switch from said first thread to said second thread while the pipeline associated with said first thread is asserting priority and a previous switch to said second thread was suppressed while said pipeline was asserting priority.

11. A computer processor as recited in claim 5 wherein said fairness monitor can provide fairness indications indicating fairness, unfairness favoring a first thread and unfairness favoring a second thread, said resource allocator applying a bias favoring said second thread in response to a fairness indication indicating unfairness favoring said first thread, said resource allocator terminating said bias in response to a fairness indication indicating unfairness favoring said second thread.

12. A processor as recited in claim 5 wherein said fairness indications can indicate fairness, unfairness favoring a first thread, and unfairness favoring a second thread, said resource allocator applying a bias favoring said second thread in response to a fairness indication indicating unfairness favoring said first thread, said allocator terminating said bias in response to a fairness indication indicating fairness.

13. A computer processor as recited in claim 1 wherein said resource includes at least one of the following: execution cycles, cache capacity, register capacity, and channel bandwidth.

14. A computer processor as recited in claim 1 wherein said fairness monitor distinguishes levels of unfairness, and said resource allocator applies different levels of bias to correspond to said different levels of unfairness.

15. A computer processor as recited in claim 1 wherein, when unfairness is indicated, said resource allocator suppresses an assertion of high priority by a requestor favored by said unfairness.

16. A computer system comprising:
    a multi-way cache;
    processor cores requiring access to said multi-way cache;
    a resource allocator configured to allocate said multi-way cache to all of said processor cores and at least partially withholding said multi-way cache from each of said processor cores some but not all the time; and
    a fairness monitor configured to track allocations of said multi-way cache to each of said processor cores, said fairness monitor making comparisons of said amounts and evaluating the fairness of said allocations as a function of said comparisons, said fairness monitor being coupled to said allocator to bias said allocator so as to offset unfairness determined by said fairness monitor wherein said fairness monitor evaluates fairness in terms of an estimate of how many cache lines resident in the cache at any given time were inserted by each of said processor cores, wherein said allocator remains unbiased despite a determination of unfairness when said fairness monitor also determines that a victim of unfairness does not need more access to said resource because of an insufficient number of cache misses.

17. A system as recited in claim 16 wherein said allocator implements said bias by reserving at least one cache section for use by a core determined by said fairness monitor to be a victim of unfairness.

18. A system as recited in claim 17 wherein said resource allocator further removes said bias when said fairness monitor determines that said allocation is no longer unfair.

19. A system as recited in claim 17 wherein said resource allocator further removes said bias when said fairness monitor determines that said allocation is no longer unfair.

20. A method comprising:
allocating a processor resource among requestors for said processor resource to yield allocations;
using a counter, tracking allocations of said processor resource to said requestors to yield allocation counts representing a comparative allocation;
determining whether said comparative allocation is fair, unfair favoring a first requestor, or unfair disfavoring said first requestor;
biasing said allocating to favor said first requestor in response to a determination that said comparative allocation has transitioned from fair to unfair disfavoring said first requestor while said allocating is unbiased; and
continuing to bias said allocating is response to a determination that said comparative allocation has transitioned from unfair disfavoring said first requestor to fair while said allocating is biased favoring said first requestor.

21. A method as recited in claim 20 wherein said resource is one of execution cycles, cache lines, and communications bandwidth.

22. A method as recited in claim 20 wherein said resource is an execution unit and said requestors are instruction pipelines.

23. A method as recited in claim 22 wherein said biasing involves changing a duty cycle associated with said allocating.

24. A method as recited in claim 22 wherein said biasing involves ignoring assertions of priority by a requestor benefiting from a determined unfairness.

25. A method as recited in claim 20 wherein said processor resource is cache capacity and said requestors are processor cores.

26. A method as recited in claim 20 wherein no bias is applied even in the event of a determining of unfairness provided there is also a determination that a victim of unfairness has insufficient need for additional access to said resources.

27. A method as recited in claim 26 wherein said resource is an execution unit and said requestors are instruction pipelines, and said insufficient need is determined when a victim pipeline signals a lack of need.

28. A method as recited in claim 26 wherein said resource is a cache, said requestors are processor cores, and said insufficient need is determined by a lack of cache misses by a victim core that is a victim of determined unfairness.

29. A method as recited in claim 20 wherein said determining distinguishes levels of unfairness, and said biasing applies different levels of bias to correspond to said different levels of unfairness.

30. A method as recited in claim 20 wherein, when unfairness is indicated, said biasing involves suppressing an assertion of high priority by a requestor favored by said unfairness.

31. A method as recited in claim 20 further comprising removing a bias favoring said first requestor in response to a determination that said comparative allocation has transitioned from fair to unfair favoring said first requestor while said allocating is biased in favor of said first requestor.

* * * * *

UNITED STATES PATENT AND TRADEMARK OFFICE
CERTIFICATE OF CORRECTION

PATENT NO.       : 8,219,996 B1
APPLICATION NO.  : 11/746067
DATED            : July 10, 2012
INVENTOR(S)      : Dale C. Morris Page 1 of 1

It is certified that error appears in the above-identified patent and that said Letters Patent is hereby corrected as shown below:

In column 2, line 6, delete "data" and insert -- data; --, therefor.

In column 8, line 42, in Claim 16, after "A" delete "computer".

In column 9, line 6, in Claim 19, delete "no longer unfair." and insert -- unfair in favor of said victim. --, therefor.

Signed and Sealed this
Eighth Day of January, 2013

David J. Kappos
*Director of the United States Patent and Trademark Office*